United States Patent [19]

Cobb

[11] 4,030,871

[45] June 21, 1977

[54] MOLD APPARATUS

[75] Inventor: John Farley Cobb, Van Buren, Ark.

[73] Assignee: Whirlpool Corporation, Benton Harbor, Mich.

[22] Filed: June 23, 1976

[21] Appl. No.: 699,082

[52] U.S. Cl. .............................. 425/388; 425/403; 425/438; 249/184; 425/DIG. 58

[51] Int. Cl.² ........................................ B29C 17/04

[58] Field of Search .... 425/388, DIG. 58, DIG. 43; 249/178, 183, 184, 185, 186

[56] References Cited

UNITED STATES PATENTS

| 994,643 | 6/1911 | Johnson | 249/185 X |
|---|---|---|---|
| 2,784,455 | 3/1957 | Pulaski | 425/DIG. 58 |
| 3,126,582 | 3/1964 | Scott | 425/388 |
| 3,237,913 | 3/1966 | Sellers | 425/DIG. 43 |
| 3,279,739 | 10/1966 | Long | 249/184 X |
| 3,302,245 | 2/1967 | Scott | 425/DIG. 58 |
| 3,467,741 | 9/1969 | Kesling | 425/388 X |
| 3,577,593 | 4/1971 | Jackson | 425/DIG. 58 |

FOREIGN PATENTS OR APPLICATIONS

| 1,237,243 | 6/1960 | France | 425/DIG. 58 |
|---|---|---|---|
| 1,179,699 | 10/1964 | Germany | 425/DIG. 58 |
| 1,168,056 | 4/1964 | Germany | 425/DIG. 58 |
| 1,249,505 | 7/1967 | Germany | 425/DIG. 58 |
| 1,952,758 | 4/1971 | Germany | 249/186 |

Primary Examiner—J. Howard Flint, Jr.
Attorney, Agent, or Firm—Wegner, Stellman, McCord, Wiles & Wood

[57] ABSTRACT

An apparatus for molding plastic sheet and the like by a thermoforming process, wherein an overhanging hollow portion is formed in the molded sheet by a retractable mold portion having a plurality of resiliently connected elements which may be moved relative to each other as the mold portion is withdrawn from the overhanging, formed sheet portion. In the illustrated embodiment, a plurality of spring means are provided for providing different positioning functions in arranging the movable mold portion in the desired configuration.

6 Claims, 9 Drawing Figures

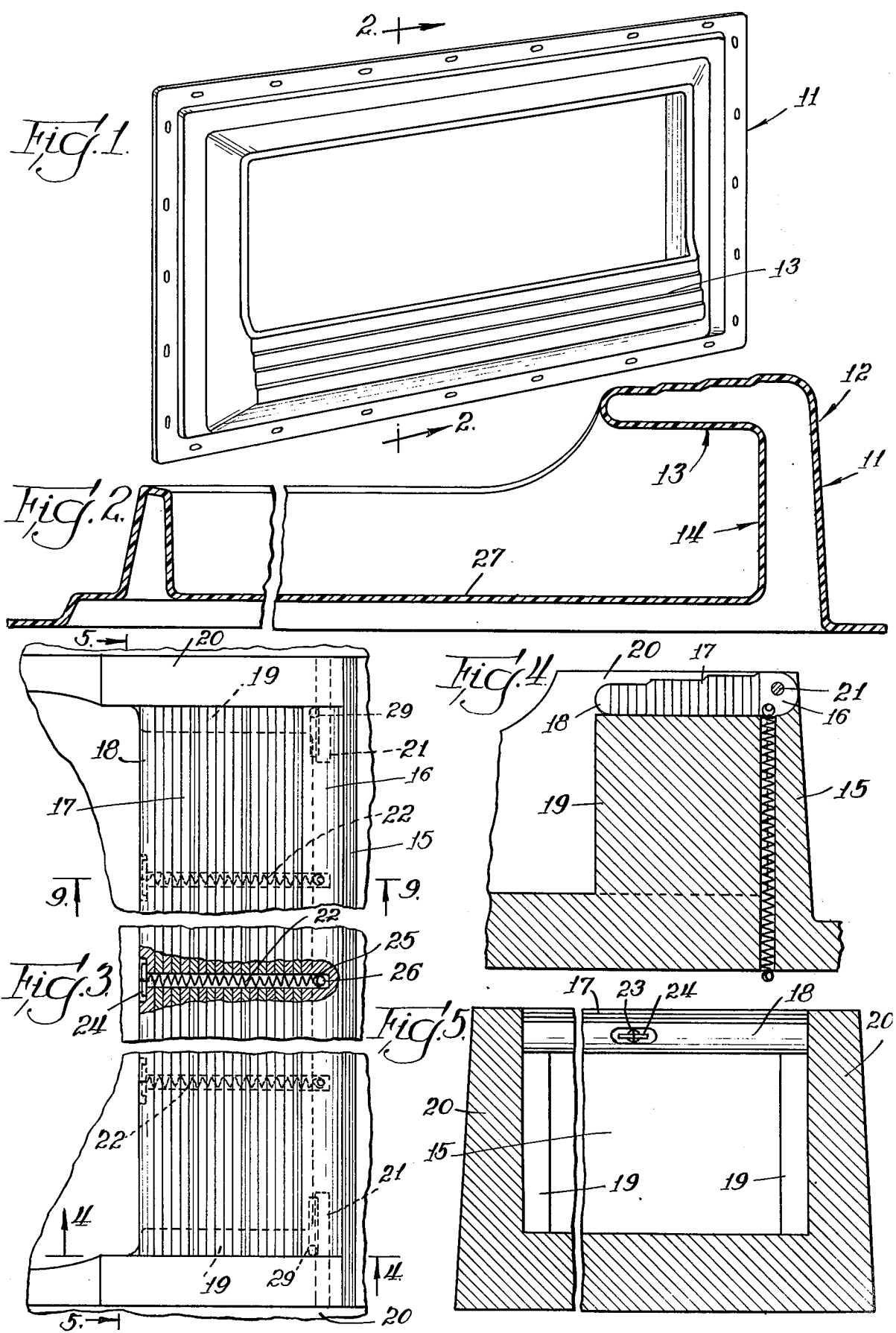

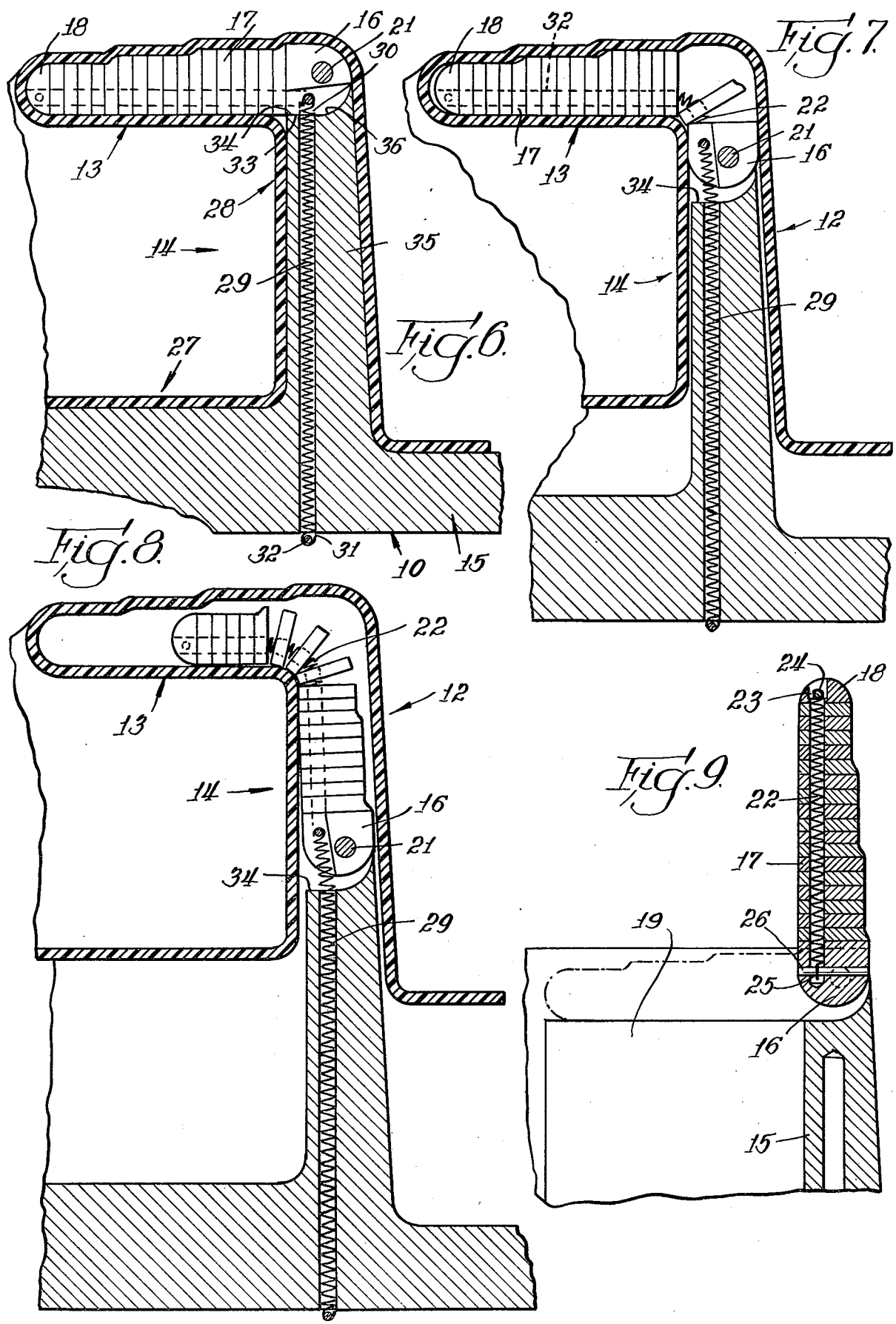

MOLD APPARATUS

BACKGROUND OF THE INVENTION

1. Field of the Invention

This invention relates to the molding of sheet material and, in particular, to thermoform molding of plastic sheet material to define overhanging hollow sections therein.

2. Description of the Prior Art

In forming cabinets such as for use in appliances, including refrigerators, freezers and the like, portions of the cabinets, such as portions of the door of the cabinet, may be formed from a plastic sheet which is molded in a thermoforming operation to define a complex, multi-recessed configuration. Certain portions of the configuration may be undercut, presenting a problem in the removal of the thermoformed sheet from the mold, resulting from interference of the mold portion defining the undercut portion of the molded sheet.

On example of such a vacuum thermoformed cabinet wall is illustrated in U.S. Pat. No. 2,784,455 of John W. Pulaski. As shown therein, the door sheet is provided with a recessed portion defined by a movable head pivotally carried on an arm so as to be swung out of the formed recess during the withdrawal of the molded sheet from the mold. A plurality of such movable heads are provided for providing correspondingly a plurality of such recesses, and means are provided for simultaneously retracting each of the heads during the sheet removing operation.

In U.S. Pat. No. 3,126,582 of Lester Scott, a vacuum molding apparatus is shown wherein a rubber disc is provided for defining an annular bead in the thermoformed sheet. The disc is supported centrally so as to flex peripherally during the sheet withdrawing operation, leaving a hollow annular bead in the molded sheet.

Lester Scott, in his subsequent U.S. Pat. No. 3,302,245, discloses an apparatus for forming plastic articles, utilizing a plurality of bar-like segments pivotally connected to each other by a series of links to define a unitarily movable flexible core. The bars are provided with pins extending into slots in end guide plates for guiding movement of the bars during a withdrawal operation wherein the bars move serially along the preselected path defined by the guide plate slots. Relatively expensive apparatus must be provided for effecting the desired withdrawal operation, and the segment, link, pin, and guide structure is similarly complicated and expensive.

Keith W. Kesling, in U.S. Pat. No. 3,467,741, shows a method of making a shelf front such as for use in refrigerator doors, wherein the formed sheet envelopes wooden sticks comprising reinforcing members defining separate folds in the thermoformed sheet. The sticks are retained in the sheet and, thus, form a maintained portion of the formed sheet.

SUMMARY OF THE INVENTION

The present invention comprehends an improved, thermoforming mold apparatus wherein a plurality of mold elements are urged into a series arrangement defining an overhanging mold portion, about which a sheet may be thermoformed to define an overhanging, hollow, molded sheet portion.

The apparatus further includes means for withdrawing the elements serially from one end of the turned arrangement to retract the mold portion from the hollow sheet portion.

The elements are urged into the series arrangement by spring means which permits the elements to move relative to each other and independently of each other during the retraction from the hollow sheet portion.

In the illustrated embodiment, the mold elements include a plurality of individually movable stacked strips which are urged into abutting facial relationship by a first spring. The stack of strips is connected to one end of another mold element. More specifically, the stack is pivotally connected to the other element and is urged into an angled or turned relationship relative to the other element by a second spring. In this manner, the stack of movable elements and the other element define an overhanging mold portion about which sheet material may be thermoformed.

The swinging of the stack on the pivot is limited by a stop to effectively position the stack in the desired arrangement to define the desired overhanging mold configuration.

The strips may be formed of rigid material such as metal, to provide an effective, rigid mold about which the sheet may be thermoformed, while yet the resilient means permits ready relative movement between the strips to effectively provide the flexibility required to permit retraction of the mold portion from the hollow molded sheet without damage thereto.

Thus, the mold apparatus of the present invention is extremely simple and economical of construction, while yet providing the highly desirable features discussed above.

BRIEF DESCRIPTION OF THE DRAWING

Other features and advantages of the invention will be apparent from the following description taken in connection with the accompanying drawing wherein:

FIG. 1 is a perspective view of a thermoformed sheet structure as may be formed by mold apparatus embodying the invention;

FIG. 2 is a broken, enlarged vertical section thereof, taken substantially along the line 2—2 of FIG. 1;

FIG. 3 is a top plan view, with portions broken away, of a mold apparatus embodying the invention;

FIG. 4 is a fragmentary, vertical section taken substantially along the line 4—4 of FIG. 3;

FIG. 5 is a broken, horizontal section taken substantially along the line 5—5 of FIG. 3;

FIG. 6 is a fragmentary, further enlarged, vertical section illustrating the thermoforming of a sheet about the mold;

FIG. 7 is a vertical section similar to that of FIG. 6 but illustrating an initial step in the removal of the mold from the formed sheet;

FIG. 8 is a vertical section similar to that of FIG. 7 but illustrating a further step in the removal of the mold from the formed sheet; and FIG. 9 is a vertical section taken substantially along the line 9—9 of FIG. 3.

DESCRIPTION OF PREFERRED EMBODIMENT

In the exemplary embodiment of the invention as disclosed in the drawings, a mold apparatus generally designated 10 is provided for use in thermoforming a plastic sheet to form a structure such as a refrigerator door inner panel 11 illustrated in FIG. 1. The cabinet structure includes a hollow overhanging portion generally designated 12, as shown in FIG. 2, which illustratively may define the front portion 13 of a lower shelf 14. Portion 12 presents a serious problem in the thermoforming thereof, in that it is difficult to remove from such a hollow overhang the mold portion about which the overhang is formed.

The present invention comprehends providing a mold 10 having an improved portion which is flexible during the retraction thereof from the overhanging, molded sheet portion 12, as will be brought out more fully hereinafter.

As illustrated in FIG. 6, mold 10 includes a plurality of interconnected elements including a first, carrier element 15, a second, connector element 16, third, strip elements 17 and an end element 18. As shown in FIGS. 3 and 4, carrier 15 includes end portions 19 on which the opposite ends of strip elements 17 and end element 18 rest in the mold forming configuration. As shown in FIG. 3, the opposite ends of the strip elements 17 and end element 18 abut enlarged ends 20 of the carrier.

Connector element 16 is pivotally mounted to ends 20 by a pivot rod 21 extending between ends 20. As best seen in FIG. 9, strip elements 17 and end element 18 are biased into facial, abutting relationship by a coil spring 22 having a distal end 23 connected to end element 18 by a pin 24, and an opposite end 25 connected to connector element 16 by a pin 26.

The tension of spring 22 is preselected to effectively maintain the stacked elements 17 in the mold defining configuration of FIG. 4 when the mold is in the normal mold forming configuration, with the ends of elements 17 and 18 seated on carrier portions 19 to permit the desired thermoforming of a sheet 27 about the mold and, more specifically, to permit the thermoforming of a portion 28 of the sheet about mold portion 10, as illustrated in FIG. 6. The thermoforming operation comprises a conventional operation wherein the plastic sheet is suitably heated and drawn about the mold by application of suitable vacuum, as is well known to those skilled in the art.

The stacked arrangement of elements 17 and 18 is maintained in the mold forming configuration of FIG. 4 and 6 relative to the carrier 15 by a second coil spring 29 having one end 30 connected to pin 26 and an opposite end 31 connected to a pin 32 exteriorly of mold portion 15. As shown in FIG. 6, connector 16 includes a planar stop portion 33 urged against a shoulder portion 34 of element 15 by spring 29 to position the stacked elements 17 and 18 substantially perpendicularly to the longitudinal extent of the adjacent portion 35 of element 15 in the mold forming configuration. Element portion 35 further defines an arcuate recess 36 receiving the connector 16 in the mold forming configuration, as illustrated in FIG. 6.

The stop 33, shoulder 34 and recess 36 may be formed to position the stacked elements 17 in any desired angular relationship with respect to carrier element 15. Thus, the overhanging mold portion defined by these elements need not necessarily lie in a plane which is perpendicular to the plane defined by element 15, but rather may lie in a plane at any desired angle.

Upon completion of the thermoforming of the sheet, the mold 10 is retracted from the formed, hollow sheet portion 28 by simple withdrawal of element 35 which concurrently effects withdrawal of the stacked elements 17 and 18 from the front portion 13 of the shelf. In retracting the entire mold portion from the turned portion 12 of the shelf, spring 22 permits separation of elements 17 one from the other and from end element 18 as the elements turn from the shelf portion 13 into shelf portion 12 as illustrated in FIGS. 7 and 8. At the same time, spring 29 permits connector portion 16 to pivot on rod 21 away from shoulder 34 so as to arrange the stacked elements 17 and 18 in substantial alignment with portion 35 of element 15, as shown in FIG. 9. The tension of spring 29 and spring 22 is preselected to permit ready shifting of the mold portion 10 from the configuration of FIG. 6 to the final configuration of FIG. 9 without damaging the thermoformed sheet portion 14, while yet assuring that the mold portion 10 positively defines the desired mold configuration during the thermoforming process.

Thus, the mold apparatus 10 is extremely simple and economical of construction as compared to the relatively complex and costly mechanisms of the prior art. No sacrificial material need be retained within the molded sheet 27 as required in certain prior art structures. The extent of wall portion 13 of the molded sheet may be substantial as compared to the relatively small overhang portions of the prior art structures as limited by the prior art forming apparatuses.

As the mold structure automatically arranges itself in the mold forming configuration on retraction thereof from a previous thermoformed sheet, and automatically re-arranges itself in flexibly accommodating the retraction movement, no special guides or retracting means are required, further facilitating and minimizing the cost of the thermoforming operation, while yet permitting the provision of relatively deep, hollow, turned portions in the thermoformed sheet.

In summary, the mold apparatus of the present invention for thermoforming an article to include a first hollow portion, such as hollow portion 13 of door panel 11, which is spaced from and overhangs a second portion, such as portion 27 thereof includes a plurality of mold elements 10 including a carrier element 15 provided with a turned portion 35 projecting from the base portion thereof. A second portion of the plurality of mold elements is defined by the strip elements, or segments, 17 and end element 18 which is connected to the distal end of the turned carrier element portion 35 by a connector 16. The spring 22 defines a first spring means for urging the segments yieldably into a series stacked arrangement, as shown in FIG. 6. The spring 29 defines a second spring means for yieldably urging the series stacked arrangement of segments into a preselected turned relationship with the turned portion 35 of the carrier whereby the carrier and segments effectively define a resiliently flexible returned mold about which a sheet may be thermoformed to define a wall, such as wall 11, having a hollow turned projection formed about turned carrier portion 35 and a returned hollow portion extending from the distal end of the turned projection defined by the stacked segments 17, as shown in FIG. 6. Thus, the returned hollow portion is spaced from and overhangs the base portion of the door panel, as seen in FIG. 6.

The use of the springs 22 and 29 permits facilitated removal of the mold elements from the hollow molded article by permitting turning of the elements relative to each other, as illustrated in FIGS. 6–9.

The foregoing disclosure of specific embodiments is illustrative of the broad inventive concepts comprehended by the invention.

Having described the invention, the embodiments of the invention in which an exclusive property or privilege is claimed are defined as follows:

1. Mold apparatus for thermoforming an article to include a first hollow portion which is spaced from and overhangs a second portion of said article, said mold apparatus comprising:

a plurality of mold elements including a first, carrier element having a base portion and a turned portion projecting from said base portion, and a second element movably mounted to the distal end of said carrier turned portion, and comprising a plurality of segments;

first spring means for urging said segments yieldably into a series stacked arrangement, second spring means for yieldably urging said series stacked arrangement into a preselected turned relationship with said turned portion of the carrier to define a resiliently flexible returned mold, said mold elements cooperatively defining a mold apparatus about which a sheet may be thermoformed to define a wall having a hollow turned projection on a base and a returned hollow portion extending from the distal end of the turned projection and being spaced from and overhanging said base, said first and second spring means cooperatively permitting facilitated removal of said elements from said hollow molded article portion by permitting turning of said elements relative to each other during such removal.

2. The apparatus of claim 1 wherein said mold second element comprises a stack of elongated strips urged into facial abutment by said first spring means.

3. The mold apparatus of claim 1 including pivot means pivotally mounting said stack to the distal end of said carrier turned portion, said second spring means resiliently pivoting said stack relative to said carrier turned portion.

4. The mold apparatus of claim 3 wherein said carrier turned portion includes a stop adjacent said pivot means, said second spring means urging said stack into an angled relationship relative to said carrier determined by said stop.

5. The thermoforming mold apparatus of claim 1 wherein said mold elements comprise rigid elements yieldably interconnected by said first and second spring means.

6. The thermoforming mold apparatus of claim 1 wherein said first spring means maintains said stacked arrangement of segments effectively rigid during thermoforming of the sheet thereabout.

* * * * *